US012710709B2

(12) United States Patent
Ohata

(10) Patent No.: US 12,710,709 B2
(45) Date of Patent: Aug. 18, 2026

(54) DEVELOPING APPARATUS INCLUDING PROTRUDING PORTION OVERLAPPING DISCHARGE PORT

(71) Applicant: CANON KABUSHIKI KAISHA, Tokyo (JP)

(72) Inventor: Toshiya Ohata, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/900,455

(22) Filed: Sep. 27, 2024

(65) Prior Publication Data

US 2025/0110424 A1 Apr. 3, 2025

(30) Foreign Application Priority Data

Oct. 2, 2023 (JP) ................................ 2023-171666

(51) Int. Cl.
*G03G 15/08* (2006.01)

(52) U.S. Cl.
CPC ..... *G03G 15/0891* (2013.01); *G03G 15/0898* (2013.01)

(58) Field of Classification Search
None
See application file for complete search history.

(56) References Cited

U.S. PATENT DOCUMENTS

| | | | | |
|---|---|---|---|---|
| 9,098,018 B2 * | 8/2015 | Kashimoto ........ | G03G 15/0812 |
| 9,841,704 B2 * | 12/2017 | Matsumoto ........ | G03G 15/0893 |
| 11,199,793 B2 * | 12/2021 | Shirayanagi ....... | G03G 15/0893 |
| 2005/0175376 A1 * | 8/2005 | Sekiguchi .......... | G03G 15/0886 399/258 |
| 2010/0129110 A1 * | 5/2010 | Kawaguchi ........ | G03G 15/0893 399/104 |
| 2011/0026975 A1 * | 2/2011 | Okuda ............... | G03G 15/0875 399/263 |
| 2011/0150537 A1 * | 6/2011 | Watanabe .......... | G03G 15/0893 399/256 |
| 2021/0063914 A1 | 3/2021 | Suzuki | |

* cited by examiner

*Primary Examiner* — Arlene Heredia Ocasio
(74) *Attorney, Agent, or Firm* — Canon U.S.A., Inc. IP Division

(57) ABSTRACT

A developing apparatus includes a first conveyance screw including a first blade member and a second blade member, a discharge path, and a magnet. The first conveyance screw further includes a third blade member arranged in the discharge path, arranged downstream of the second blade member in a first direction, and configured to convey the developer in the first direction. A discharge port is arranged downstream of an upstream end of the third blade member in the first direction. The magnet is arranged downstream of an upstream end of the discharge port in the first direction. A protruding portion protruding in a radial direction of a rotation shaft of the first conveyance screw is provided on the rotation shaft in an area located downstream of the third blade member and upstream of the magnet in the first direction, the area overlapping the upstream end of the discharge port.

20 Claims, 12 Drawing Sheets

DEVELOPING APPARATUS INCLUDING PROTRUDING PORTION OVERLAPPING DISCHARGE PORT

BACKGROUND

Field of the Disclosure

The present disclosure relates to a developing apparatus.

Description of the Related Art

In a developing apparatus employing a two-component developer, what is called a trickle developing method of supplying toner including a minute amount of carrier while discharging excess developer through a discharge port is widely used to prevent the deterioration of carrier particles. In the developing apparatus employing the trickle developing method, there is a case where an air current flows out from a discharge port due to an increase of an internal pressure in a developer container caused by driving, and in this case, the developer in the developer container is discharged excessively carried by the air current.

United States Patent Application Publication No. 2021-0063914 discusses a technique of reducing excessive discharge of developer due to the air current by providing a magnetic field generation unit, such as a magnet, to the developing apparatus to form an agent accumulation area that attracts part of the developer to be discharged by a magnetic force of the magnetic field generation unit, and covering the discharge port with the agent accumulation area.

In the configuration of reducing the excessive discharge of the developer by covering the discharge port with the agent accumulation area formed by the magnetic field generation unit discussed in United States Patent Application Publication No. 2021-0063914, a force required for discharging the developer is large compared with a case where the discharge port is not covered with the agent accumulation area. Further, since a conveyance screw in the agent accumulation area slides against the developer whose flowability is limited by the magnetic force of the magnetic field generation unit, there is a possibility that a degree of abrasion may increase compared with a case where the agent accumulation area is not formed.

Meanwhile, in recent years, a longer operating life of the developing apparatus is desired, and accordingly it is desired to reduce abrasion of the conveyance screw because the abrasion of the conveyance screw can be an essential factor of limiting the life of the developing apparatus.

SUMMARY

Embodiments of the present disclosure are directed to a technique for reducing both excessive discharge of developer and abrasion of a conveyance screw.

According to an aspect of the present disclosure, a developing apparatus includes a developer bearing member configured to bear and convey developer containing toner and carrier to develop an electrostatic image formed on an image bearing member, a developer container including a first chamber and a second chamber separated from the first chamber by a partition wall, the developer container being configured to contain the developer to be supplied to the developer bearing member, a first conveyance screw arranged in the first chamber, the first conveyance screw including a rotation shaft, a first blade member helically formed on an outer circumference surface of the rotation shaft and configured to convey the developer in a first direction, and a second blade member arranged downstream of the first blade member in the first direction, helically formed on the outer circumference surface of the rotation shaft, and configured to convey the developer in a second direction being a direction opposite to the first direction and deliver the developer from the first chamber to the second chamber, a second conveyance screw arranged in the second chamber and configured to convey the developer in the second direction, a discharge path arranged downstream of the second blade member in the first direction to discharge the developer in the first direction, the discharge path being provided with a discharge port arranged to oppose the rotation shaft and configured to discharge part of the developer conveyed in the discharge path from the discharge path in a direction intersecting with the first direction, and a magnet, wherein the first conveyance screw further includes a third blade member arranged in the discharge path, arranged downstream of the second blade member in the first direction, helically formed on the outer circumference surface of the rotation shaft, and configured to convey the developer in the first direction, wherein the discharge port is arranged downstream of an upstream end of the third blade member in the first direction, wherein the magnet is arranged downstream of an upstream end of the discharge port in the first direction, and wherein a protruding portion protruding in a radial direction of the rotation shaft is provided on the rotation shaft in an area located downstream of the third blade member and upstream of the magnet in the first direction, the area overlapping the upstream end of the discharge port.

According to another aspect of the present disclosure, a developing apparatus includes a developer bearing member configured to bear and convey developer containing toner and carrier to develop an electrostatic image formed on an image bearing member, a developer container including a first chamber and a second chamber separated from the first chamber by a partition wall, the developer container being configured to contain the developer to be supplied to the developer bearing member, a first conveyance screw arranged in the first chamber, the first conveyance screw including a rotation shaft, a first blade member helically formed on an outer circumference surface of the rotation shaft and configured to convey the developer in a first direction, and a second blade member helically formed on the outer circumference surface of the rotation shaft and configured to convey the developer in a second direction being a direction opposite to the first direction, a second conveyance screw arranged in the second chamber, and configured to convey the developer in the second direction, a discharge path arranged outside a circulation path in which the developer circulates between the first chamber and the second chamber and connected to the first chamber to discharge the developer, the discharge path being provided with a discharge port arranged to oppose the rotation shaft and configured to discharge part of the developer conveyed in the discharge path from the discharge path in a direction intersecting with an axial direction of the rotation shaft, and a magnet, wherein the first conveyance screw further includes a third blade member arranged in the discharge path, helically formed on the outer circumference surface of the rotation shaft, and configured to convey the developer toward the discharge port, wherein the second blade member is provided between the first blade member and the third blade member in the axial direction of the rotation shaft, wherein the discharge port is arranged downstream of an upstream end of the third blade member in a developer conveyance direction of the third blade member, wherein the magnet is arranged downstream of an upstream end of the discharge port in the developer conveyance direction of the third blade member, and wherein a protruding portion protruding in a radial direction of the rotation shaft is provided on the rotation shaft in an area located downstream of the third blade member and upstream of the magnet in the developer conveyance direction of the third blade, the area overlapping the upstream end of the discharge port.

Further features of various embodiments will become apparent from the following description of exemplary embodiments with reference to the attached drawings.

DESCRIPTION OF THE EMBODIMENTS

Figure 1:
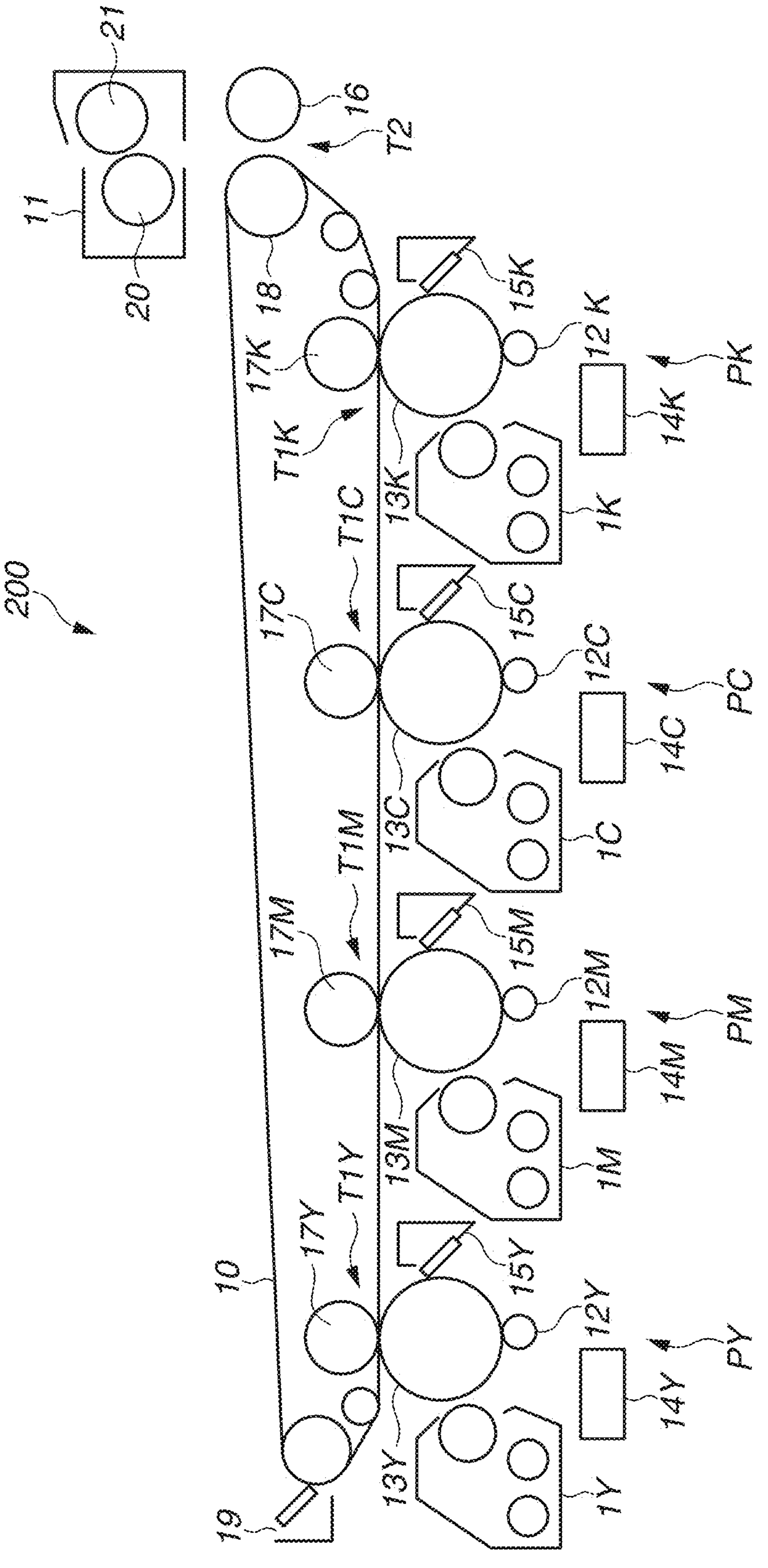
FIG. 1 is a cross-section diagram illustrating a configuration of an image forming apparatus according to a first exemplary embodiment.

Hereinbelow, exemplary embodiments of the present disclosure will be described in detail with reference to the attached drawings. Note that the following exemplary embodiments are not intended to limit every embodiment of the present disclosure related to the claims, and not all the combinations of features described in the following exemplary embodiments are necessarily essential for the solutions of the present disclosure. The present disclosure can be applied to various kinds of uses, such as printers, various kinds of printing machines, copying machines, facsimile machines, and multifunction peripherals.

<Configuration of Image Forming Apparatus>

An image forming apparatus 200 is an electrophotographic full color printer including four image forming units PY, PM, PC, and PK respectively corresponding to four colors of yellow, magenta, cyan, and black. In a first exemplary embodiment, the image forming apparatus 200 is a tandem image forming apparatus in which the image forming units PY, PM, PC, and PK are arranged in a rotation direction of an intermediate transfer belt 10 described below. The image forming apparatus 200 forms a toner image based on an image signal from a document reading apparatus (not illustrated) connected to an image forming apparatus main body or from a host apparatus, such as a personal computer (PC), communicably connected to the image forming apparatus main body. An example of a recording medium is a sheet member, such as a paper sheet, a plastic film sheet, and a cloth sheet.

In an image forming process of the image forming apparatus 200, first, the image forming units PY, PM, PC, and PK respectively form color toner images on photoconductive drums 13Y, 13M, 13C, and 13K. The toner images of respective colors formed in this way are transferred to the intermediate transfer belt 10, and then transferred from the intermediate transfer belt 10 to a recording medium. The recording medium with the toner images transferred thereto is conveyed to a fixing device 11 where the toner images are fixed onto the recording medium. Details of the configuration of the image forming apparatus 200 will be described below.

The four image forming units PY, PM, PC, and PK included in the image forming apparatus 200 have substantially the same configuration except for developing colors. Accordingly, hereinbelow, the configuration related to the image forming unit PY as a representative unit is described. The configurations related to the other image forming units PM, PC, and PK can be understood by replacing the index Y in each reference symbol in the configuration of the image forming unit PY with M, C, or K.

The image forming unit PY includes a cylindrical photosensitive member serving as an image bearing member, i.e., the photoconductive drum 13Y. A charging roller 12Y (charging device), a developing apparatus 1Y, a primary transfer roller 17Y, and a cleaning device 15Y are disposed around the photoconductive drum 13Y. An exposure device (laser scanner) 14Y is disposed below the photoconductive drum 13Y in FIG. 1.

The charging roller 12Y is driven and rotated by the photoconductive drum 13Y at an image forming time. The charging roller 12Y is urged by a pressure spring (not illustrated) toward the photoconductive drum 13Y. Further, a charging bias is applied to the charging roller 12Y from a high voltage power supply. With the charging bias, the photoconductive drum 13Y is almost uniformly charged by the charging roller 12Y.

Further, the intermediate transfer belt 10 is arranged to face the photoconductive drums 13Y, 13M, 13C, and 13K. The intermediate transfer belt 10 is stretched around a plurality of stretching rollers, and performs a circular movement driven by a driving roller, which is one of the plurality of stretching rollers. A secondary transfer counter roller 16 serving as a secondary transfer member is arranged at a position facing a secondary transfer inner roller 18, which is one of the plurality of stretching rollers, with the intermediate transfer belt 10 interposed therebetween, to form a secondary transfer portion T2 for transferring the toner image on the intermediate transfer belt 10 to the recording medium. The fixing device 11 is disposed downstream of the secondary transfer portion T2 in a recording medium conveyance direction. Further, a feeding unit (not illustrated) is disposed in a lower part of the image forming apparatus 200. The recording medium fed from the feeding unit when an image forming operation starts is conveyed to the secondary transfer portion T2 at a predetermined timing.

The image forming process of forming an image by the image forming apparatus 200 configured as described above will be described. First, when the image forming operation is started, a surface of the rotating photoconductive drum 13Y is uniformly charged by the charging roller 12Y. Next, the photoconductive drum 13Y is exposed to a laser beam emitted from the exposure device 14Y, and the laser beam corresponds to an image signal. With the exposure, an electrostatic latent image (electrostatic image) corresponding to the image signal is formed on the photoconductive drum 13Y. The electrostatic latent image on the photoconductive drum 13Y is visualized with the toner contained in the developing apparatus 1Y as a visible image (toner image).

The toner image formed on the photoconductive drum 13Y is primarily transferred to the intermediate transfer belt 10 at a primary transfer portion T1Y formed between the photoconductive drum 13Y and the primary transfer roller 17Y with the intermediate transfer belt 10 interposed therebetween. The toner remaining on the photoconductive drum 13Y (transfer residual toner) after the primary transfer is removed by the cleaning device 15Y.

Such an operation is sequentially performed by each of the image forming units PM, PC, and PK for magenta, cyan, and black so that the four color toner images overlap on the intermediate transfer belt 10. Then, a recording medium stored in a recording medium storage cassette (not illustrated) of the feeding unit is conveyed to the secondary transfer portion T2 in synchronization with a toner image forming timing, and the four color toner images on the intermediate transfer belt 10 are integrally secondarily transferred to the recording medium. The toner not transferred at the secondary transfer portion T2 and remaining on the intermediate transfer belt 10 is removed by an intermediate transfer belt cleaner 19.

Next, the recording medium is conveyed to the fixing device 11. The fixing device 11 includes a fixing roller 20 provided with a heat source such as a halogen heater therein, and a pressure roller 21 to form a fixing nip portion therebetween. The toner image is fixed to the recording medium by passing the recording medium conveyed to the fixing device 11 through the fixing nip portion. Then, the recording medium is discharged outside the image forming apparatus 200. In this way, a series of image forming processes is completed. In addition, using only a desired image forming unit or units, it is possible to form an image of a desired color or colors.

<Developer>

Now, a two-component developer used in the first exemplary embodiment will be described. The developer obtained by mixing negatively charged non-magnetic toner and positively charged magnetic carrier is used. The non-magnetic toner is toner obtained by adding fine powders of, for example, titanium oxide or silica to a surface of a powder obtained by smashing or polymerizing a resin, such as polyester and styrene acrylic, containing a coloring material, a wax component, and the like. The magnetic carrier is obtained by resin-coating the surface layer of each core made of resin particles composed of ferrite particles and magnetic powders mixed.

<Configuration of Developing Apparatus>

Figure 2:
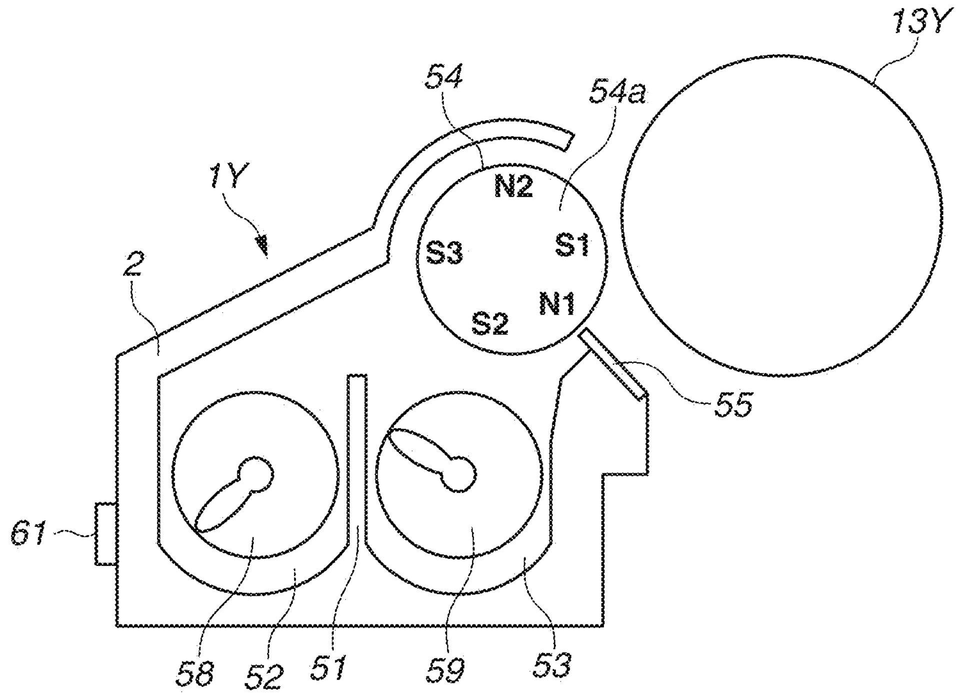
FIG. 2 is a cross-section diagram illustrating configurations of a developing apparatus and a photoconductive drum according to the first exemplary embodiment.

Next, with reference to FIGS. 2 and 3, a configuration of the developing apparatus 1Y will be described in detail. Note the developing apparatus 1M, 1C, and 1K have a similar configuration thereto. The developing apparatus 1Y includes a developer container 2 containing developer including magnetic carrier and non-magnetic toner, and a developing sleeve 54 serving as a developer bearing member bearing and conveying the developer contained in the developer container 2. The developing sleeve 54 is held such that a surface thereof is rotatable, and a magnetic roller 54*a* including a plurality of magnetic poles (S1, S2, S3, N1, and N2) is arranged in a non-rotatable manner inside the developing sleeve 54.

The developer container 2 is partitioned by a partition wall 51 into a first conveyance path (agitation chamber) 52 serving as a first chamber, and a second conveyance path (developing chamber) 53 serving as a second chamber, and the first conveyance path 52 and the second conveyance path 53 communicate with each other via communication ports on both ends of each of the first conveyance path 52 and the second conveyance path 53. In this way, the first conveyance path 52 and the second conveyance path 53 form a circulation path of the developer.

The developer container 2 is provided with two screw members serving as conveyance members that agitate and convey the developer. More specifically, a first conveyance screw 58 (first conveyance member) is provided in the first conveyance path 52, and a second conveyance screw 59 (second conveyance member) is provided in the second conveyance path 53. The first and second conveyance screws 58 and 59 respectively include rotation shafts 58*a* and 59*a*, and blades 58*b* and 59*b* arranged around the rotation shafts 58*a* and 59*a* (on the rotation shafts) in a helical manner.

The first conveyance screw 58 rotates around the rotation shaft 58*a* to convey the developer in the first conveyance path 52 by the helical blade 58*b* (blade member) in an arrow α direction (first direction), which is one of directions in a lengthwise direction (shaft direction of the rotation shaft 58*a*) of the developing apparatus 1Y. The second conveyance screw 59 rotates around the rotation shaft 59*a* to convey the developer in the second conveyance path 53 by the helical blade 59*b* in an arrow β direction (second direction opposite to the first direction), which is the other direction in the lengthwise direction (shaft direction of the rotation shaft 59*a*) of the developing apparatus 1Y. In this way, the developer is circulated between the first conveyance path 52 and the second conveyance path 53.

The developing apparatus 1Y includes a toner density sensor (magnetic permeability sensor) 61 serving as a density detection unit capable of detecting a toner density (i.e., T/D ratio which is a ratio of the toner particle weight to the total weight of carrier particles and toner particles) of the toner in the developer container 2. The toner density sensor 61 is disposed at a predetermined position in the first direction of the first conveyance path 52 to detect the toner density in the first conveyance path 52.

In the first exemplary embodiment, as the toner density sensor 61, an inductance sensor is used, and a sensor surface (detection surface) of the inductance sensor is exposed in the first conveyance path 52.

The inductance sensor detects a magnetic permeability within a predetermined detection range from the sensor surface. When the toner density of the developer changes, the magnetic permeability determined by a mixing ratio of the magnetic carrier and the non-magnetic toner also changes. Accordingly, the toner density can be detected by detecting a change of the magnetic permeability by the inductance sensor.

The developer in the second conveyance path 53 is pumped up by the second conveyance screw 59, which is arranged below the developing sleeve 54 in the second conveyance path 53, to a magnetic field range of the magnetic pole S2 and borne on the surface of the developing sleeve 54. The borne developer is conveyed by the rotation of the surface of the developing sleeve 54. A regulation blade 55 is disposed, as a member that forms a thin layer of the developer, in the vicinity of the magnetic pole N1 of the developing sleeve 54 with a predetermined gap from the surface of the developing sleeve 54.

In general, the gap between the developing sleeve 54 and the regulation blade 55 is set to be about 200 to 500 μm, and the larger the gap is, the more the amount of developer borne on the developing sleeve 54 is.

The conveyed developer forms a magnetic brush at the magnetic pole N1, and a desired amount of the developer forms a thin layer on the surface of the developing sleeve 54 by the regulation blade 55 disposed at a predetermined gap from the developing sleeve 54. Then, the developer conveyed to a portion opposing the photoconductive drum 13Y forms a magnetic brush again at the magnetic pole S1 to form a developing nip between the developing sleeve 54 and the photoconductive drum 13Y.

The surface of the photoconductive drum 13Y is charged to a predetermined electrical potential by the charging roller 12Y as described above, and an image portion is exposed to light by the exposure device 14Y to form an exposure potential. On the other hand, a developing bias is applied to the developing sleeve 54 via a high voltage circuit (not illustrated). The developing bias is generated by, for example, superimposing a rectangular alternating current (AC) waveform on a predetermined voltage direct current (DC) waveform. The toner charged in the developing apparatus 1Y is attached to an exposed portion in the developing nip by a driving force generated due to a potential difference between the developing bias and a drum surface. In this way, the developing process is completed.

The carrier and the undeveloped toner are conveyed downstream in the rotation direction of the developing sleeve 54, lose a magnetic constraint force in a zero-gauss band, which is a region in which a magnetic flux density in the radial direction is zero, formed between the magnetic poles S2 and S3, and are collected in the second conveyance path 53 again.

When a developing operation is preformed, only the toner is consumed in the developer, and thus a weight ratio (T/D ratio) of the toner to the developer decreases. Thus, the T/D ratio is controlled by performing a toner replenishment operation. In the first exemplary embodiment, the predetermined T/D ratio is set to 8%.

Figure 3:
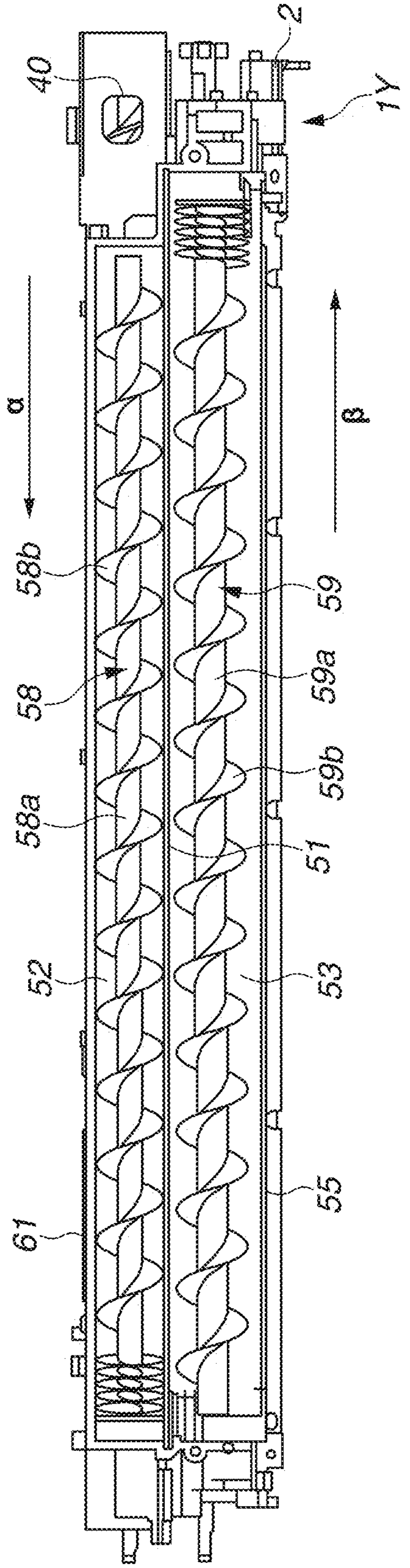
FIG. 3 is a plan view illustrating the developing apparatus according to the first exemplary embodiment, with a part omitted.

Toner replenishment is performed through a toner replenishment port 40 provided in the developer container 2 (see FIG. 3).

In the first exemplary embodiment, the toner replenishment port 40 is provided on an upstream end in the first direction of the first conveyance screw 58 and vertically above a portion that is not the conveyance path of the first conveyance path 52. However, the position of the toner replenishment port 40 is not limited to this position, and the toner replenishment port 40 may be provided at any position depending on the configuration or the like of the image forming apparatus main body. The supplied toner is circulated in the first conveyance path 52 and the second conveyance path 53 while being agitated and conveyed together with the developer by the first conveyance screw 58 and the second conveyance screw 59.

<Trickle Developing Method>

The developing apparatus 1Y according to the first exemplary embodiment employs a trickle developing method (hereinbelow, referred to as "trickle") to reduce deterioration of the carrier in the developer. The trickle is a developing method of discharging excess developer through a discharge port 100 (see FIG. 6 or the like) provided in the developer container 2 when a level of the developer in the developer container 2 becomes a predetermined level or more, and of supplying carrier using a minute amount of carrier included in the replenishment toner.

Figure 4A:
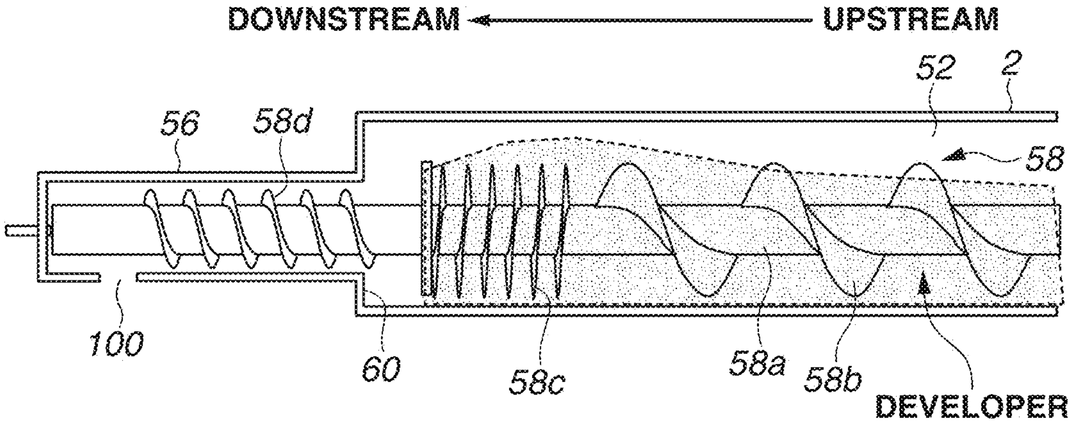
FIGS. 4A and 4B are schematic diagrams respectively illustrating a state where a developer surface of developer is low and a state where the developer surface of the developer is a predetermined level or higher.
Figure 4B:
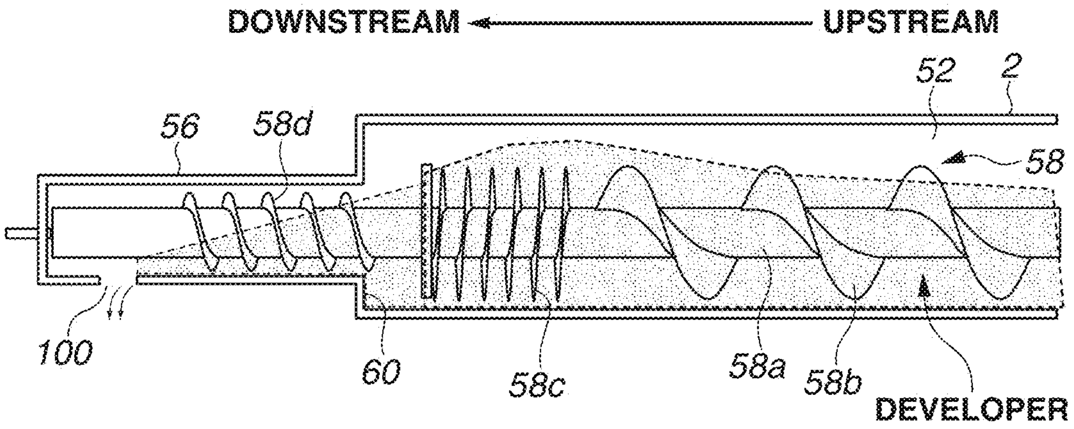

FIGS. 4A and 4B are diagrams illustrating a general configuration example of a trickle, and a mechanism. Hereinbelow, the terms "upstream" and "downstream" respectively indicate upstream (right side in FIGS. 4A and 4B) and downstream (left side in FIGS. 4A and 4B) in the conveyance direction of toner (first direction) by the blade 58*b* of the first conveyance screw 58.

The first conveyance screw 58 includes the rotation shaft 58*a*, the blade 58*b* that conveys the developer in the first direction in the first conveyance path 52, and a reverse conveyance member 58*c* serving as a reverse conveyance unit that pushes back the developer in an upstream direction at a downstream end of the first conveyance screw 58. A discharge path 56 for discharging the excess developer is connected to the downstream side of the first conveyance path 52, and the discharge port 100 is open on the downstream side of the discharge path 56 toward the downside in the gravitational direction. The discharge port 100 is arranged so as to oppose the rotation shaft 58*a* of the first conveyance screw 58 to discharge part of the developer conveyed to the discharge path 56 from the discharge path 56 in a direction intersecting with the first direction. The discharge path 56 is provided outside the circulation path of the developer container 2, and connected to the first conveyance path 52. The bottom surface of the discharge path 56 is located vertically above the bottom surface of the first conveyance path 52.

A conveyance shape 58*d* is provided in the discharge path 56. The conveyance shape 58*d* is a conveyance screw with a helical blade formed on the rotation shaft 58*a*, which is the same rotation shaft as that of the first conveyance screw 58, and has a function of conveying the developer in a downstream direction toward the discharge port 100. The discharge path 56 is formed to be smaller than the first conveyance path 52 in internal diameter, and the conveyance shape 58*d* is formed to be smaller than the blade 58*b* in outer diameter.

In FIGS. 4A and 4B, satin finished portions represent areas where the developer is present, in a pseudo manner. As illustrated in FIG. 4A, when the level of the developer in the first conveyance path 52 is low and a developer surface is low, all the developer conveyed by the blade 58*b* is pushed back by the reverse conveyance member 58*c*. On the other hand, as illustrated in FIG. 4B, when the level of the developer in the first conveyance path 52 increases to raise the developer surface to a predetermined level or more, the developer that cannot be pushed back by the reverse conveyance member 58*c* runs over the reverse conveyance member 58*c*. Then, when the run-over developer accumulates to exceed a step 60 located between the first conveyance path 52 and the discharge path 56, the developer becomes conveyable by the conveyance shape 58*d* and is conveyed to the discharge port 100 to be discharged as the excess developer.

In this way, with the trickle developing method, the amount of developer in the developer container 2 increases along with the toner replenishment operation with regard to the replenishment toner including the minute amount of carrier. Then, when the level becomes the predetermined level or more, part of the developer including deteriorated carrier overflows further toward the rear of the reverse conveyance member 58*c* to be discharged through the discharge port 100. In this way, it is possible to suppress the deterioration of the carrier.

<Excessive Discharge of Developer>

As describe above, the trickle developing method is an effective technique for reducing the deterioration of carrier in the developer. However, there may be a case where the discharge of the developer by the trickle developing method is excessive (more than expected).

Figure 5:
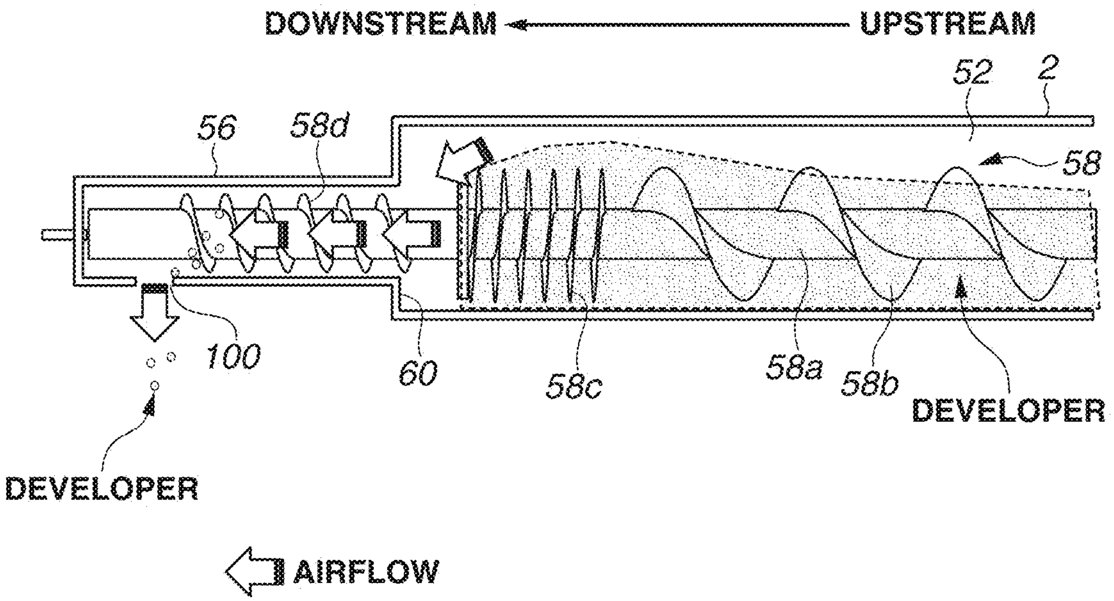
FIG. 5 is a schematic diagram illustrating an excessive developer discharge mechanism in a case where a trickle developing method is employed.

For example, when a driving speed of the developing apparatus 1Y becomes higher along with a speed-up of the image forming apparatus in recent years, an amount of air taken into the developer container 2 due to the rotation of the developing sleeve 54 increases, and the internal pressure of the developer container 2 rises. As a result of a rise of the internal pressure of the developer container 2 while the outside of the developer container 2 is at an atmospheric pressure, a pressure difference is generated between the inside and outside of the developer container 2. Thus, an air current blowing out from the discharge port 100 to the outside of the developer container 2 is generated as illustrated in FIG. 5. The air current contains the developer stirred up by the first conveyance screw 58, the developer reaches the discharge path 56 and is conveyed by the conveyance shape 58*d* in the downstream direction. In this way, even in the case where the level of the developer has not reached the level at which the developer is to be discharged, a minute amount of developer flows out through the discharge port 100.

As described above, if the "excessive discharge" state in which the discharge by the trickle is conducted even though the level of the developer is low continues, the amount of developer in the developer container 2 gradually decreases, and there is a possibility that a sufficient amount of developer cannot be supplied to the developing sleeve 54.

<Measures Against Excessive Discharge of Developer>

Figure 6:
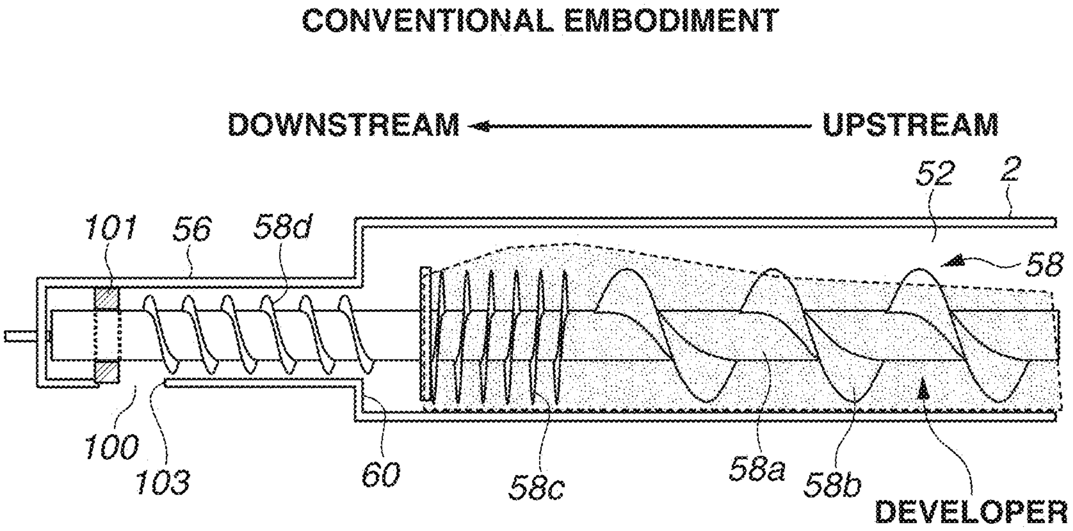
FIG. 6 is a schematic diagram illustrating a part of a first conveyance path and a discharge path of a developing apparatus according to a conventional embodiment.

Thus, in a conventional embodiment, a ring-shaped magnet member 101 serving as a magnetic field generation unit is arranged on a downstream side of the conveyance shape 58*d* in the conveyance direction at an end portion of the discharge port 100, as illustrated in FIG. 6. With this configuration, a method of preventing the excessive discharge of the developer in the developer container 2 is devised.

Figure 7:
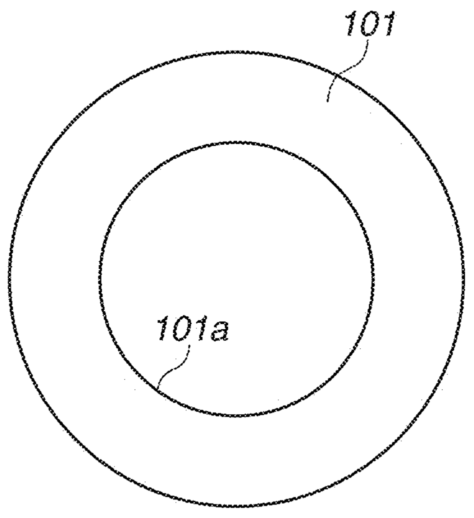
FIG. 7 is a plan view of a magnet member.

As illustrated in FIG. 7, the magnet member 101 is formed in a ring shape and fixed to a whole circumference of an inner wall of the discharge path 56 on the downstream side of the conveyance shape 58*d*. More specifically, the magnet member 101 is arranged at a predetermined distance from an upstream end portion 103 of the discharge port 100 in the first direction.

The ring-shaped magnet member 101 has a shape illustrated in FIG. 7, and is 14 mm in outer diameter, 8 mm in internal diameter, and 1.5 mm in thickness in the first exemplary embodiment. The magnet member 101 is configured such that the rotation shaft 58*a* passes through the center of the magnet member 101. In this way, an inner circumferential surface 101*a* of the magnet member 101 faces an outer circumference surface of the rotation shaft 58*a* with a small gap therebetween all around the inner circumferential surface 101*a* of the magnet member 101.

The magnet member 101 has one surface magnetized to south(S) pole and the other surface magnetized to north (N) pole. The magnetic flux density of a surface thereof is 50 mT or more and 60 mT or less (measured using GX-100 produced by Nihon Denji Sokki Co., Ltd.), is used. Further, in the first exemplary embodiment, the N pole surface is arranged to face the discharge port 100, but either pole may be arranged to face the discharge port 100. If the magnetic flux density of the magnet member 101 is too large, frictional sliding between the attached developer and the rotation shaft 58*a* of the conveyance shape 58*d* may become strong, and the toner may be fixedly attached thereto. On the other hand, if the magnetic flux density thereof is too small, the effect of the first exemplary embodiment cannot be obtained. For this reason, in the first exemplary embodiment, the magnetic flux density is set within the range described above, but the magnetic flux density may be appropriately set depending on the configuration of the apparatus.

The developer conveyed by the conveyance shape 58*d* is dropped and discharged through the discharge port 100, but part of the discharged developer is attracted, due to the magnetic force of the magnet member 101, and attached to the surface of the magnet member 101. When the amount of developer attached to the surface of the magnet member 101 gradually increases, an agent accumulation area 102 is formed by the attached developer, as illustrated in FIG. 8.

Figure 8:
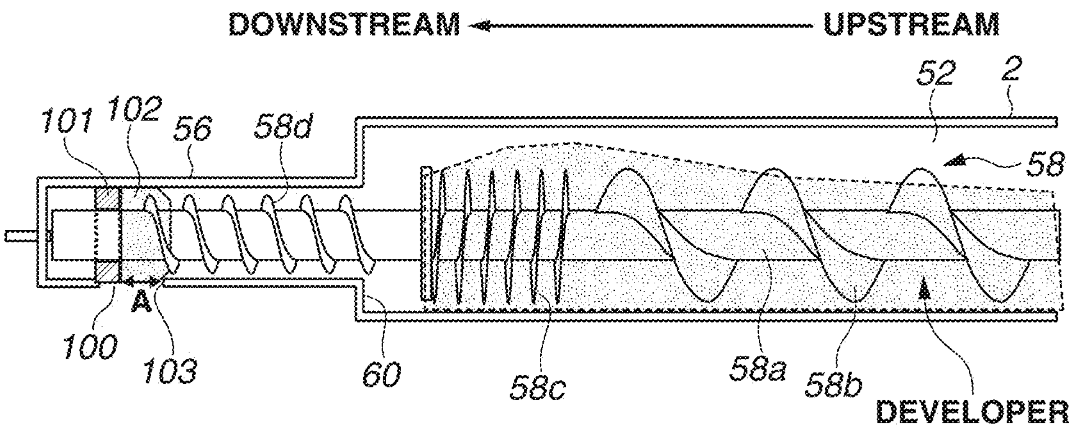
FIG. 8 is a schematic diagram illustrating an agent accumulation area formed by a magnetic field of the magnet member.

Since the agent accumulation area 102 is formed so as to extend from the magnet member 101 in the direction toward the upstream end portion 103 (right direction in FIG. 8) of the discharge port 100, the discharge port 100 is covered with the agent accumulation area 102 formed as illustrated in FIG. 8.

When the discharge port 100 is covered with the agent accumulation area 102, the flow path through which the developer from the discharge port 100 flows to the outside of the developer container 2, as illustrated in FIG. 5, is blocked by the agent accumulation area 102, and the amount of air current flowing out to the outside can be reduced. Thus, it is possible to prevent the developer from being discharged to the outside through the discharge port 100 due to the air current.

On the other hand, even though the discharge port 100 is covered with the agent accumulation area 102, the developer conveyed by the conveyance shape 58*d* is pushed in the direction toward the agent accumulation area 102 by a conveyance force of the conveyance shape 58*d*. Then, since the developer is discharged downward naturally through the discharge port 100 due to the gravitational force when the amount of developer exceeds the amount of developer that can be held by the magnetic force of the magnet member 101, the developer does not clog the vicinity of the discharge port 100. In this way, it is possible both to reduce the excessive discharge of the developer due to the air current and to discharge the developer normally by the conveyance shape 58*d*.

Conveyance of the developer by the first conveyance screw 58 is performed by the developer contacting the blade 58*b* of the first conveyance screw 58 receiving a force in a rotation shaft direction of the first conveyance screw 58 by the rotation of the first conveyance screw 58. The first conveyance screw 58 rotates and contacts the developer in this way to apply the force to the developer to convey the developer. In general, the conveyance screw for conveying the developer is made of a resin material in many cases, and when the conveyance screw continues rotating to apply the force to the developer to convey the developer, abrasion occurs at portions contacting the developer.

As described above with reference to FIG. 8, in the configuration of covering the discharge port 100 with the agent accumulation area 102 formed by the magnet member 101, when the excess developer is discharged, the developer is discharged by pushing the developer in the agent accumulation area 102 by the conveyance force of the conveyance shape 58*d*. The configuration of covering the discharge port 100 with the agent accumulation area 102 formed by the magnet member 101 in this way is for reducing the excessive discharge of the developer, but the force required for discharging the developer becomes large compared with the configuration in which the discharge port 100 is not covered therewith. Further, if the conveyance shape 58*d* in the agent accumulation area 102 slides against the developer whose flowability is limited by the magnetic force of the magnet member 101, there is a possibility that a degree of abrasion of the conveyance shape 58*d* may increase compared with the case where the agent accumulation area 102 is not formed.

The abrasion amount is not an issue if it is within a degree that allows the developing apparatus 1Y to exert the function with no problem after an expected use period. However, in recent years, a longer operating life of the developing apparatus is desired, and accordingly it is desired to reduce the abrasion of the conveyance shape 58*d* because the abrasion of the conveyance screw can be an essential factor of limiting the life of the developing apparatus.

The first exemplary embodiment is an example of reducing both the excessive discharge of the developer and the abrasion of the first and second conveyance screws 58 and 59, using a configuration described below. Hereinbelow, details thereof will be described.

Figure 9:
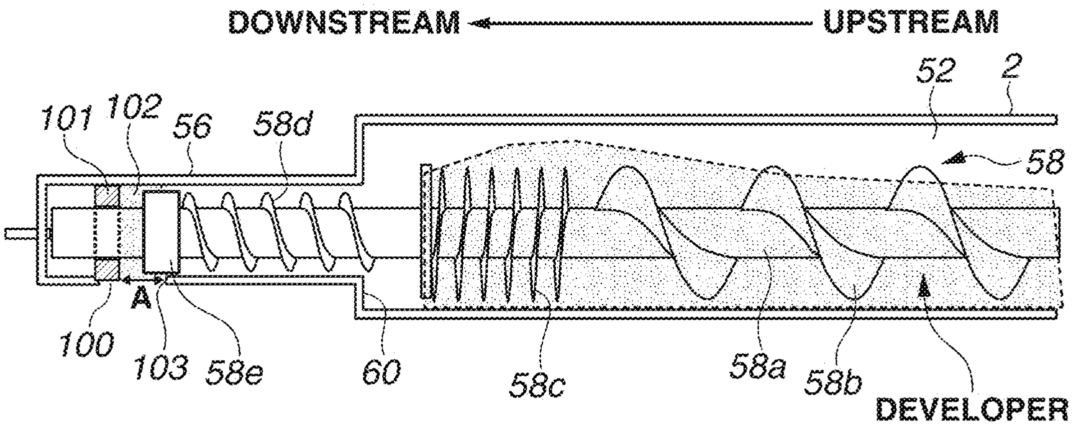
FIG. 9 is a cross-section diagram illustrating a positional relationship between a discharge port and a push-out shape according to the first exemplary embodiment.
Figure 10A:
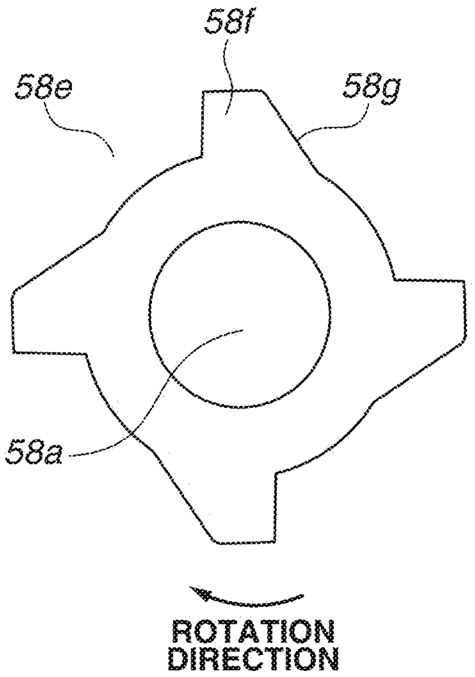
FIGS. 10A and 10B are a cross-section diagram of the push-out shape according to the first exemplary embodiment, and a perspective diagram of a conveyance shape of a first conveyance screw and the push-out shape according to the first exemplary embodiment, respectively.
Figure 10B:
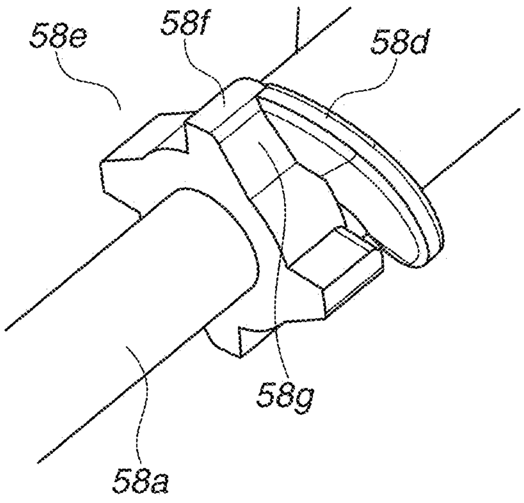

In the first exemplary embodiment, as illustrated in FIG. 9, a push-out shape 58*e* is provided downstream of the conveyance shape 58*d* in the conveyance direction of the conveyance shape 58*d* of the first conveyance screw 58, and the push-out shape 58*e* is provided vertically above the discharge port 100. Further, as illustrated in FIGS. 10A and 10B, the push-out shape 58*e* is a protruding portion protruding from the rotation shaft 58*a* in a radial direction of the rotation shaft 58*a*, and includes a protruding portion 58*f* and a push-out surface 58*g*.

The conveyance shape 58*d* has a function of conveying the developer in a direction (rotation axis direction of the first conveyance screw 58) parallel to the rotation shaft 58*a* by the rotation of the first conveyance screw 58. On the other hand, the push-out shape 58*e* has a function of conveying the developer in a radial direction of the rotation shaft 58*a* by the push-out surface 58*g* moved by the rotation of the first conveyance screw 58.

In a case where the push-out shape 58*e* is not provided, since the discharge port 100 is vertical to the conveyance direction of the developer by the conveyance shape 58*d*, the conveyance shape 58*d* needs to convey the developer until the amount of developer exceeds the amount of developer that can be held by the magnetic force of the magnet member 101.

In contrast thereto, in a case where the push-out shape 58*e* is provided, since the push-out shape 58*e* is located vertically above the discharge port 100 to move the developer in the radial direction, the developer forming the agent accumulation area 102 can be conveyed in the direction toward the discharge port 100.

With this configuration, the excess developer can be discharged before the amount of the developer exceeds the amount of the developer that can be held by the magnetic force of the magnet member 101, and the amount of the developer to be pushed in reduces, thus the abrasion of the conveyance shape 58*d* can be reduced.

Now, the shape of the push-out shape 58*e* will be described in more detail.

As illustrated in FIG. 10A, the push-out surface 58*g* is formed to connect one end near the rotation shaft 58*a* and the other end near a leading end of the protruding portion 58*f*. The push-out surface 58*g* is inclined in such a manner that the one end near the rotation shaft 58*a* of the push-out surface 58*g* is located upstream of the other end near the leading end of the protruding portion 58*f* in the rotation direction, with respect to a surface orthogonal to the rotation direction of the first conveyance screw 58. When the push-out surface 58*g* is inclined in this way, at a time of the rotation of the first conveyance screw 58, the push-out surface 58*g* can efficiently convey the developer present in the vicinity of the one end near the rotation shaft 58*a* toward the other end near the leading end of the protruding portion 58*f*.

Further, as illustrated in FIG. 10B, one of protruding portions 58*f* of the push-out shape 58*e* is continuously connected to a blade of the conveyance shape 58*d*, and the conveyance shape 58*d* and the push-out shape 58*e* have the same outer diameters. In other words, the protruding portion (push-out shape 58*e*) formed on the rotation shaft 58*a* of the first conveyance screw 58 is continuously arranged without a space between the downstream end of the conveyance shape 58*d* and the protruding portion in the conveyance direction of the conveyance shape 58*d*. Further, the protruding portion (push-out shape 58*e*) formed on the rotation shaft 58*a* of the first conveyance screw 58 is the same as the conveyance shape 58*d* in outer diameter. With this configuration, since the developer conveyed to the push-out shape 58*e* by the conveyance shape 58*d* can be continuously conveyed in the radial direction, the developer can be efficiently conveyed in the direction of the discharge port 100.

As described above, in the first exemplary embodiment, the magnet member 101 is arranged downstream of the upstream end of the discharge port 100 in the conveyance direction of the conveyance shape 58*d*. Further, the push-out shape 58*e* protruding in the radial direction of the rotation shaft 58*a* is provided on the rotation shaft 58*a* in an area located downstream of the upstream end of the discharge port 100 and upstream of the magnet member 101 in the conveyance direction by the conveyance shape 58*d*, and overlapping the upstream end of the discharge port 100. When the push-out shape 58*e* is provided, since the push-out shape 58*e* is located vertically above the discharge port 100 to move the developer in the radial direction, the developer forming the agent accumulation area 102 can be conveyed in the direction toward the discharge port 100. With this configuration, since the excess developer can be discharged before the amount of the developer exceeds the amount of the developer that can be held by the magnetic force of the magnet member 101 and the amount of developer to be pushed in decreases, the abrasion of the conveyance shape 58*d* can be reduced. As a result, reducing the excessive discharge of the developer and reducing the abrasion of the conveyance screw can both be achieved.

In the first exemplary embodiment described above, the example in which the push-out surface 58*g* of the push-out shape 58*e* is a flat surface is described. On the other hand, in a second exemplary embodiment, an example in which the push-out surface 58*g* of the push-out shape 58*e* is not a flat surface but a curved surface will be described.

The basic configuration and the operation of an image forming apparatus 200 according to the second exemplary embodiment are the same as those of the image forming apparatus 200 according to the first exemplary embodiment. Thus, in the image forming apparatus 200 according to the second exemplary embodiment, components having the same or corresponding functions and configurations as those of the image forming apparatus 200 according to the first exemplary embodiment are assigned the same reference symbols as those in the first exemplary embodiment, and detailed descriptions thereof are omitted.

Figure 11:
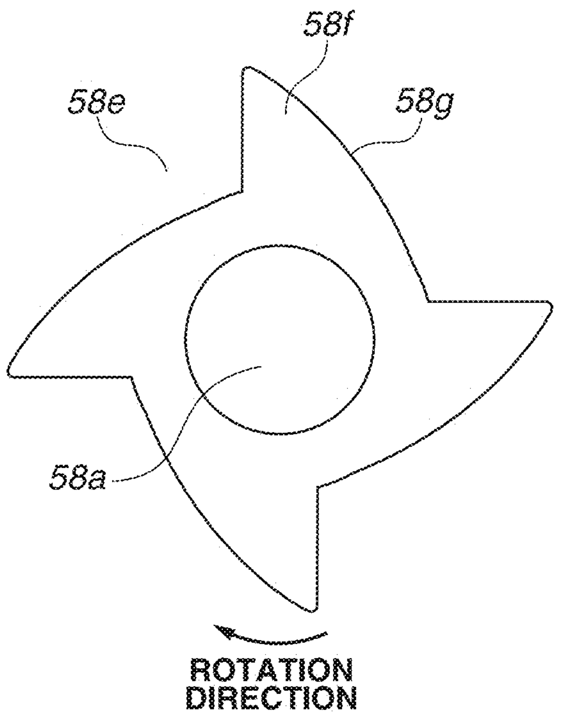
FIG. 11 is a cross-section diagram of a push-out shape according to a second exemplary embodiment.

As illustrated in FIG. 11, in the second exemplary embodiment, the shape of a push-out surface 58*g* of a push-out shape 58*e* is a curved surface, which is different from that in the first exemplary embodiment.

The shape of the push-out surface 58*g* according to the second exemplary embodiment illustrated in FIG. 11 can convey the developer present near the rotation shaft 58*a* toward the leading end of the protruding portion 58*f* in the radial direction by the rotation of the push-out shape 58*e*. Accordingly, the conveyance shape 58*d* according to the second exemplary embodiment can reduce the abrasion of the conveyance shape 58*d* because the excess developer can be discharged before the amount of the developer exceeds the amount of the developer that can be held by the magnetic force of the magnet member 101 to reduce the amount of the developer to be pushed in.

In the first exemplary embodiment described above, the description is given of the example in which the push-out surface 58*g* is inclined in such a manner that the one end of the push-out surface 58*g* near the rotation shaft 58*a* is positioned to be on the upstream side of the other end near the leading end of the protruding portion 58*f* in the rotation direction with respect to the surface orthogonal to the rotation direction of the first conveyance screw 58.

Further, in the first and second exemplary embodiments, the description is given of the example in which the push-out shape 58*e* has the four protruding portions 58*f*.

On the other hand, in a third exemplary embodiment, as described below, the push-out surface 58*g* is not inclined, and the push-out shape 58*e* has three protruding portions 58*f*.

The basic configuration and the operation of an image forming apparatus 200 according to the third exemplary embodiment are the same as those of the image forming apparatus 200 according to the first exemplary embodiment. Thus, in the image forming apparatus 200 according to the third exemplary embodiment, components having the same or corresponding functions and configurations as those of the image forming apparatus 200 according to the first exemplary embodiment are assigned the same reference symbols as those in the first exemplary embodiment, and detailed descriptions thereof are omitted.

Figure 12:
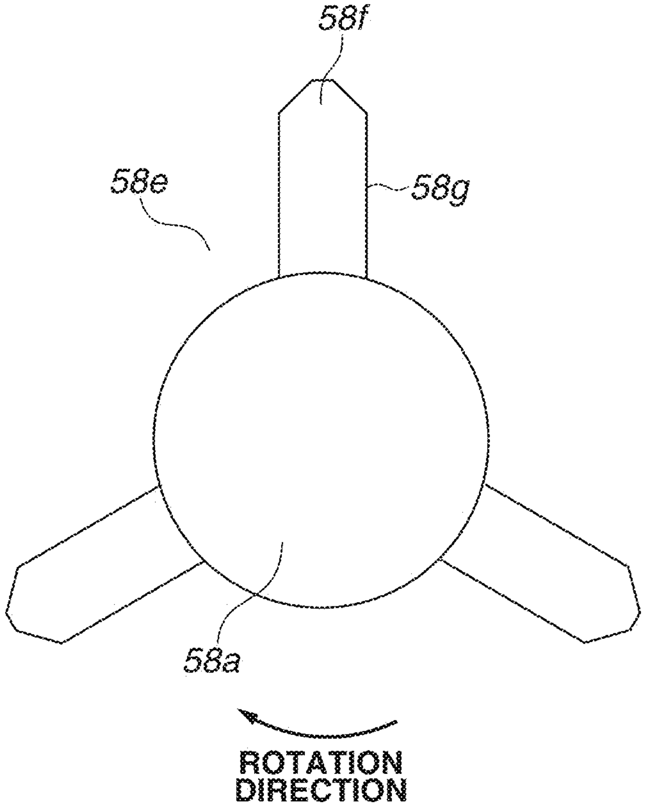
FIG. 12 is a cross-section diagram of a push-out shape according to a third exemplary embodiment.

As illustrated in FIG. 12, in the third exemplary embodiment, the shape of a push-out surface 58*g* is not inclined, which is different from that in the first exemplary embodiment, and is a flat surface orthogonal to the rotation direction of the push-out shape 58*e*. Further, the number of protruding portions 58*f* is three in the third exemplary embodiment, whereas the number thereof is four in the first and second exemplary embodiments.

With the push-out surface 58*g* having the shape and the number of the protruding portions 58*f* according to the third exemplary embodiment illustrated in FIG. 12, the push-out surface 58*g* can convey the developer present near the rotation shaft 58*a* toward the leading end of the protruding portion 58*f* in the radial direction by the rotation of the push-out shape 58*e*. Accordingly, the conveyance shape 58*d* according to the third exemplary embodiment can reduce the abrasion of the conveyance shape 58*d* because the excess developer can be discharged before the amount of the developer exceeds the amount of the developer that can be held by the magnetic force of the magnet member 101 to reduce the amount of the developer to be pushed in.

Some embodiments are not limited to the above-described exemplary embodiments, and various modifications including organic combinations of the exemplary embodiments are possible based on the gist of the present disclosure. Those modifications are not to be excluded from the scope of the present disclosure.

In the above-described exemplary embodiments, as illustrated in FIG. 1, the image forming apparatus 200 primarily transfers the toner images respectively borne on the photoconductive drums 13Y, 13M, 13C, and 13K to the intermediate transfer belt 10. Then, the image forming apparatus 200 brings the recording medium into contact with the intermediate transfer belt 10 to secondarily transfer the toner images borne on the intermediate transfer belt 10 to the recording medium. In the exemplary embodiments described above, the image forming apparatus 200 with such a configuration is described, but it is not limited thereto. It is also possible to apply the present disclosure to an image forming apparatus with a configuration in which a recording medium is brought into contact directly with the photoconductive drums 13Y, 13M, 13C, and 13K to directly transfer the toner images borne respectively on the photoconductive drums 13Y, 13M, 13C, and 13K to the recording medium.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-171666, which was filed on Oct. 2, 2023 and which is hereby incorporated by reference herein in its entirety.

What is claimed is:

1. A developing apparatus comprising:

a developer bearing member configured to bear and convey developer containing toner and carrier to develop an electrostatic image formed on an image bearing member;

a developer container including a first chamber and a second chamber separated from the first chamber by a partition wall, the developer container being configured to contain the developer to be supplied to the developer bearing member;

a first conveyance screw arranged in the first chamber, the first conveyance screw including a rotation shaft, a first blade member helically formed on an outer circumference surface of the rotation shaft and configured to convey the developer in a first direction, and a second blade member arranged downstream of the first blade member in the first direction, helically formed on the outer circumference surface of the rotation shaft, and configured to convey the developer in a second direction being a direction opposite to the first direction and deliver the developer from the first chamber to the second chamber;

a second conveyance screw arranged in the second chamber and configured to convey the developer in the second direction;

a discharge path arranged downstream of the second blade member in the first direction to discharge the developer in the first direction, the discharge path being provided with a discharge port arranged to oppose the rotation shaft and configured to discharge part of the developer conveyed in the discharge path from the discharge path in a direction intersecting with the first direction; and a magnet, wherein the first conveyance screw further includes a third blade member arranged in the discharge path, arranged downstream of the second blade member in the first direction, helically formed on the outer circumference surface of the rotation shaft, and configured to convey the developer in the first direction, wherein the discharge port is arranged downstream of an upstream end of the third blade member in the first direction, wherein the magnet is arranged downstream of an upstream end of the discharge port in the first direction, wherein a protruding portion protruding in a radial direction of the rotation shaft is provided on the rotation shaft in an area located downstream of the third blade member and upstream of the magnet in the first direction, the area overlapping the upstream end of the discharge port in the first direction, and wherein the protruding portion overlaps the discharge port in the first direction and includes a push-out surface configured to convey the developer in the radial direction of the rotation shaft by rotation of the first conveyance screw, the push-out surface being inclined such that, with respect to a plane orthogonal to a rotation direction of the first conveyance screw, one end of the push-out surface near the rotation shaft is located upstream of another end of the push-out surface near a leading end of the protruding portion in the rotation direction.

2. The developing apparatus according to claim 1, wherein the protruding portion is continuously arranged at a downstream end of the third blade member in the first direction without a space between the downstream end of the third blade member and the protruding portion.

3. The developing apparatus according to claim 1, wherein an outer diameter of the protruding portion is same as an outer diameter of the third blade member.

4. The developing apparatus according to claim 1, wherein the magnet is fixedly arranged in the discharge path and arranged on a side of the discharge port with respect to the rotation shaft.

5. The developing apparatus according to claim 4, wherein the magnet is fixedly arranged to an inner wall surface of the discharge path.

6. The developing apparatus according to claim 1, wherein the magnet is arranged so as to overlap the discharge port in the first direction.

7. The developing apparatus according to claim 1, wherein the magnet is arranged in such a manner that an area, in which the developer is attracted to the magnet by a magnetic force of the magnet, reaches the upstream end of the discharge port in the first direction.

8. The developing apparatus according to claim 1, wherein a magnetic flux density of the magnet is 50 mT or more and 60 mT or less.

9. The developing apparatus according to claim 1, wherein a bottom surface of the discharge path is located vertically above a bottom surface of the first chamber.

10. The developing apparatus according to claim 1, wherein an outer diameter of the third blade member is smaller than an outer diameter of the first blade member.

11. A developing apparatus comprising:

a developer bearing member configured to bear and convey developer containing toner and carrier to develop an electrostatic image formed on an image bearing member;

a developer container including a first chamber and a second chamber separated from the first chamber by a partition wall, the developer container being configured to contain the developer to be supplied to the developer bearing member;

a first conveyance screw arranged in the first chamber, the first conveyance screw including a rotation shaft, a first blade member helically formed on an outer circumference surface of the rotation shaft and configured to convey the developer in a first direction, and a second blade member helically formed on the outer circumference surface of the rotation shaft and configured to convey the developer in a second direction being a direction opposite to the first direction;

a second conveyance screw arranged in the second chamber, and configured to convey the developer in the second direction;

a discharge path arranged outside a circulation path in which the developer circulates between the first chamber and the second chamber and connected to the first chamber to discharge the developer, the discharge path being provided with a discharge port arranged to oppose the rotation shaft and configured to discharge part of the developer conveyed in the discharge path from the discharge path in a direction intersecting with an axial direction of the rotation shaft; and a magnet, wherein the first conveyance screw further includes a third blade member arranged in the discharge path, helically formed on the outer circumference surface of the rotation shaft, and configured to convey the developer toward the discharge port, wherein the second blade member is provided between the first blade member and the third blade member in the axial direction of the rotation shaft, wherein the discharge port is arranged downstream of an upstream end of the third blade member in a developer conveyance direction of the third blade member, wherein the magnet is arranged downstream of an upstream end of the discharge port in the developer conveyance direction of the third blade member, wherein a protruding portion protruding in a radial direction of the rotation shaft is provided on the rotation shaft in an area located downstream of the third blade member and upstream of the magnet in the developer conveyance direction of the third blade member, the area overlapping the upstream end of the discharge port in the developer conveyance direction of the third blade member, and wherein the protruding portion overlaps the discharge port in the developer conveyance direction of the third blade member and includes a push-out surface configured to convey the developer in the radial direction of the rotation shaft by rotation of the first conveyance screw, the push-out surface being inclined such that, with respect to a plane orthogonal to a rotation direction of the first conveyance screw, one end of the push-out surface near the rotation shaft is located upstream of another end of the push-out surface near a leading end of the protruding portion in the rotation direction.

12. The developing apparatus according to claim 11, wherein the protruding portion is continuously arranged at a downstream end of the third blade member in the developer conveyance direction without a space between the downstream end of the third blade member and the protruding portion.

13. The developing apparatus according to claim 11, wherein an outer diameter of the protruding portion is same as an outer diameter of the third blade member.

14. The developing apparatus according to claim 11, wherein the magnet is fixedly arranged in the discharge path and arranged on a side of the discharge port with respect to the rotation shaft.

15. The developing apparatus according to claim 14, wherein the magnet is fixedly arranged to an inner wall surface of the discharge path.

16. The developing apparatus according to claim 11, wherein the magnet is arranged so as to overlap the discharge port in the developer conveyance direction of the third blade member.

17. The developing apparatus according to claim 11, wherein the magnet is arranged in such a manner that an area, in which the developer is attracted to the magnet by a magnetic force of the magnet, reaches the upstream end of the discharge port in the developer conveyance direction of the third blade member.

18. The developing apparatus according to claim 11, wherein a magnetic flux density of the magnet is 50 mT or more and 60 mT or less.

19. The developing apparatus according to claim 11, wherein a bottom surface of the discharge path is located vertically above a bottom surface of the first chamber.

20. The developing apparatus according to claim 11, wherein an outer diameter of the third blade member is smaller than an outer diameter of the first blade member.

* * * * *